May 13, 1958  B. PICKUP  2,834,205
ADHESION TESTING MACHINES
Filed Dec. 8, 1954  2 Sheets-Sheet 1

May 13, 1958     B. PICKUP     2,834,205
ADHESION TESTING MACHINES

Filed Dec. 8, 1954     2 Sheets-Sheet 2

INVENTOR
Bryan Pickup
by Benj. T. Rauber
his attorney

# United States Patent Office 2,834,205
Patented May 13, 1958

2,834,205

ADHESION TESTING MACHINES

Bryan Pickup, Sutton Coldfield, England, assignor to Dunlop Rubber Company Limited, London, England, a British company Application December 3, 1954, Serial No. 473,898

Claims priority, application Great Britain December 11, 1953

4 Claims. (Cl. 73—150)

This invention relates to machines for testing the adhesion between two materials by measuring the force required to strip them apart at constant speed.

Heretofore it has been customary to perform such tear-down testing by mounting a testpiece composed of a strip of each material in an autographically recording tensile testing machine, the strips being gradually torn away from each other as the jaws of the machine are drawn apart. In general, the force required to separate the two materials is not constant over the length of the material and false readings of the tear-down force from point to point along the length of the testpiece are obtained owing to the effects of the high inertia, low natural frequency of vibration, and lack of damping of the test machine.

It is the object of the present invention to provide an adhesion testing machine which will give a truer representation of the force required to separate the two materials than the machines in use heretofore.

According to the invention a machine for testing the adhesion between two materials comprises a beam having a high natural frequency of oscillation rigidly secured at one end and carrying a clamp for one material, damping means associated with the beam, a pointer extending from the free end of the beam associated with a recording device, a second clamp for the other material, and means for drawing the second clamp away from the first clamp at a constant speed.

In order that the machine should record changes in the tear-down force occurring at intervals along the length of a test strip the natural frequency of the beam and the pointer, the clamp, and the damping means secured thereto must be higher than the frequency at which the changes occur at the speed of the test. The tear-down force varies continuously along the test strip and in order to record a continuous change (which may be considered as an infinite number of changes) the natural frequency of oscillation of the beam assembly would of necessity be infinite. In general it is not necessary to record changes occurring more closely together than 100 per inch. The natural frequency of the beam assembly must be higher than the product of the spacing of the changes in tear-down force which it is required to record and the speed at which the test strip is torn apart.

The inertia effect of the beam assembly causes the pointer to overshoot the value of the actual tear-down force and damping is necessary to correct this. The degree of damping to be applied to the beam is determined by the standard of accuracy required in the tear-down force indicated by the pointer.

For example, the changes in the force required to separate two materials occurring at intervals of one hundred per inch along the direction of separation occur at a frequency of approximately 17 C. P. S. at a speed of separation of 10 inches per minute. A beam suitable for the recording of such changes has a natural frequency of vibration of 100 C. P. S. with the pointer, damping means, and clamp attached thereto.

In order that the value of the recorded separating force may be accurate to within 5% of the true separating force, the damping force acting on the beam must be at least 0.2 of the critical damping force for the beam, i. e. the minimum force which will just result in dead-beat motion of the beam and its attachments.

The first clamp may be suspended from a knife edge located adjacent the free end of the beam and the indicating device may comprise a steel stylus secured to the pointer in contact with a sooted face of a glass plate.

The invention will now be more particularly described with reference to a preferred embodiment illustrated in the accompanying drawings wherein.

Figure 1:
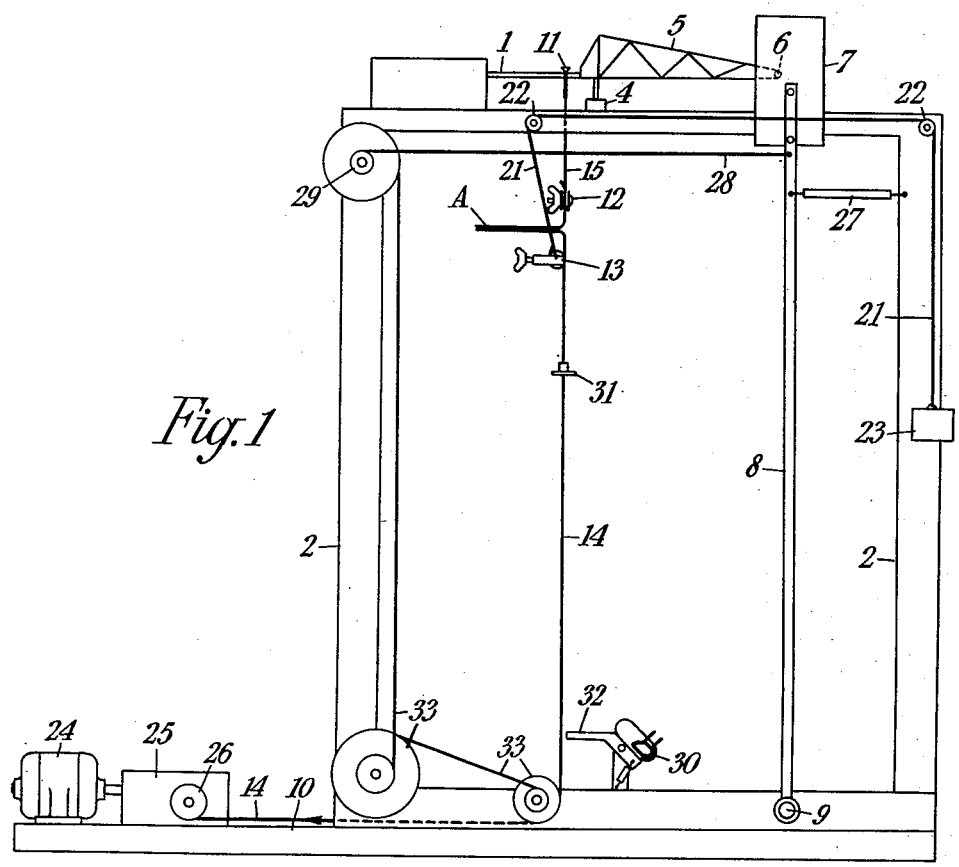
Figure 1 shows an elevation of a machine according to the invention.

Referring to Figure 1 a mild steel rectangular section beam 1, 2½ inches long and having a natural frequency of 100 C. P. S. when provided with the attachments described below, is clamped rigidly at one end at the top of a rectangular frame-work 2. Attached to the free end of the beam is a damping plunger 3 operating in a dash pot 4 filled with thick oil to give a damping force which is 0.2 times the critical damping force for the beam and its attachments. A light pointer 5 extends axially outwardly from the free end of the beam 1 and carries a steel stylus 6 arranged to contact a soot-covered surface of a glass slide mounted in a holder 7 mounted at the top end of a vertical steel beam 8 pivoted on a ball race 9 at its lower end to a base plate 10 supporting the framework 2. The length of the pointer is 7 inches and it is sufficiently resilient in a horizontal direction to ensure that the stylus 6 is always lightly touching the slide.

Figure 2:
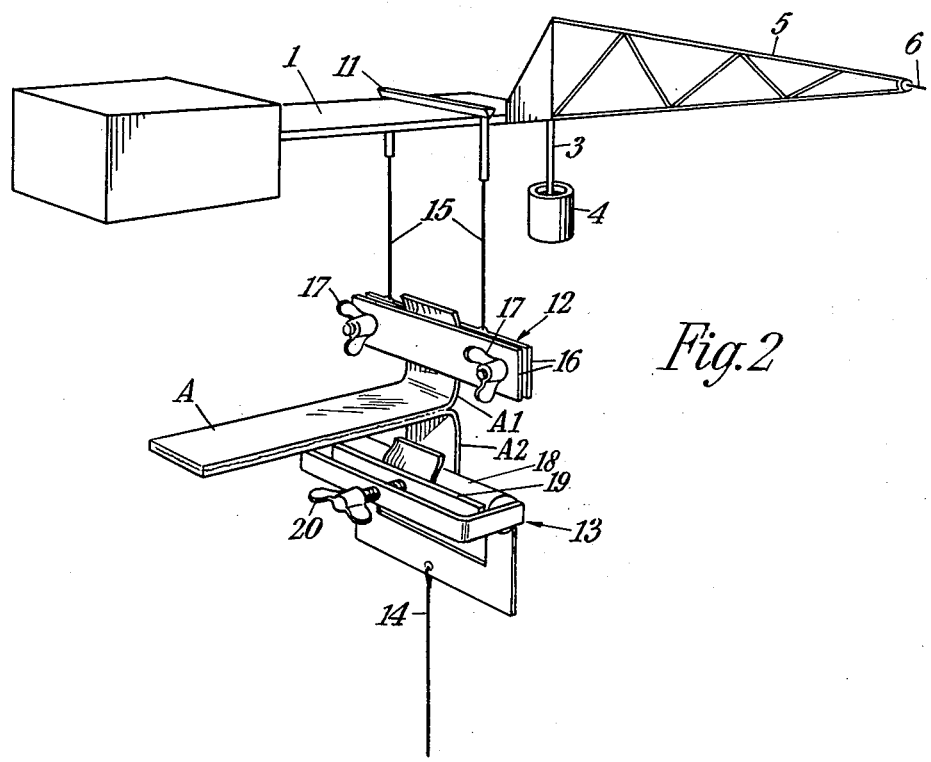
Figure 2 shows an enlarged perspective view of a detail of the machine.

As shown more clearly in Figure 2 the beam 1 carries adjacent its free end a knife edge 11 from which depend two wires 15 supporting a clamp 12 consisting of two light-alloy metal strips 16 forced together by thumbscrews 17. A second clamp 13 is attached to a wire 14 from a pulling mechanism so that it may be pulled downwardly away from the first clamp 12, as will presently be described, and comprises a cylinder 18 around which an end of a specimen strip may be wound and a thumbscrew 20 to grip the end of the strip against the cylinder. The second clamp 13 is lifted to the top of its travel when the machine is not in use by two wires 21 (Figure 1) passing over pulleys 22 at the top of the framework 2 and attached to a weight 23, the upward pull on the second clamp due to its return mechanism thus being constant throughout its range of movement.

The pulling mechanism (Figure 1) consists of an electric motor 24 on the base plate 10 driving a variable speed gearbox 25. The wire 14 from the second clamp 13 is attached to the output spindle 26 of the gearbox 25. The steel beam 8 carrying the slide holder 7 is attached to the framework 2 by a tension spring 27 and is moved against the spring tension by a cord 28 attached to a spindle 29 which rotates with the movement of the wire pulling the second clamp downwardly through a wire and pulley arrangement 33. The slide then moves transversely at a speed proportional to that of the second clamp, a convenient ratio being 5 to 192 respectively i. e. the slide moves 5/16" for each 12" of movement of the second clamp. A mercury switch 30 is incorporated in the mechanism so that the motor 24 is switched off when the second clamp 13 reaches the lower limit of the travel, a trip 31 on the wire 14 contacting the switch arm 32.

To test the adhesion of two layers of rubberised fabric a specimen strip 8 inches long and one inch wire A (Figure 2) is prepared and the layers at one end are separated for a short distance. One layer A1 is clamped between the strips 16 of the first clamp 12 and the second layer A2 is secured to the second clamp 13 as described above. The motor 24 is switched on, the speed of the output side of the gearbox 25 being set to give a predetermined speed of separation of the two layers A1, A2 as the second clamp 13 is drawn downwardly.

As the test proceeds, the variation in the stripping force between the layers A1, A2 is indicated by a trace made on a slide in the holder 7 by the stylus 6 attached to the pointer 5 on the end of the beam 1. For examination and measurement it is convenient to magnify the trace of the slide 30 times on an optical projector.

In place of a soot-covered slide heat sensitised paper may be used as a record, the stylus being heated for this purpose. The paper record is examined with an epidiascope.

A machine of the dimensions described is suitable for the testing of fabric materials at a stripping speed of 10 inches per minute or less, the maximum tear-down force being 30 pounds. Changes in the adhesive force between the materials occurring at intervals of not less than one hundredth of an inch along the strip are recorded, with a degree of accuracy of the order of 5%.

The machine described above may be modified in various ways without departing from the scope of the invention.

The mechanism described for separating the clamps and moving the glass slide horizontally can be replaced by a geared shaft drive from the motor to the lower clamp, a further shaft being geared to the drive and operating a worm gear mechanism adapted to move the slide holder in a horizontal direction.

Furthermore the separation of the clamps need not take place in a vertical direction. For example the beam could be mounted either horizontally or vertically with the moveable clamp operating within horizontal guides. Where the beam is mounted in a direction other than horizontal the direction of movement of the slide holder should be preferably at an angle of 90° to the direction of vibration of the stylus.

Having described my invention—what I claim is:

1. A machine for testing the adhesion between two materials comprising a beam having a high natural frequency of oscillation rigidly secured at one end and carrying a clamp for one material, damping means operatively connected with the beam, a recording device, a pointer extending from the free end of the beam into operative coaction with said recording device, a second clamp for the other material and means for drawing the second away from the first clamp at a constant speed, the natural frequency of the beam with the attachments thereto being at least one hundred cycles per second and the damping force provided by the damping means being at least 0.2 of the critical damping force for the beam and its attachments.

2. A machine according to claim 1 wherein the recording device comprises a sooted glass plate and means for moving said plate in a direction substantially parallel to the axis of the beam at a speed proportional to the speed of separation of the clamps and a stylus secured to the free end of the pointer so as to bear on the sooted surface of the plate.

3. A machine according to claim 1, wherein the damping means comprises a dash pot and, a plunger secured to the beam operating in said dashpot.

4. A machine according to claim 1 wherein the first clamp is suspended from the beam by a knife-edge bearing.

References Cited in the file of this patent

UNITED STATES PATENTS

| | | |
|---|---|---|
| 2,473,517 | Freedman | June 21, 1949 |
| 2,699,674 | Litty | Jan. 18, 1955 |
| 2,752,780 | Gershberg | July 3, 1956 |

OTHER REFERENCES

Article: Quantitative Method for Determining Adhesion, in Am. Paint and Varnish Mfgrs. Assoc. Circular No. 232, Feb. 1928 pp. 155–161.

Publication: ASTM Standard on Adhesives, Sept. 1954, pub. by A. S. for T. M. Philadelphia, Pa. ASTM Designation D. 903-49, pp. 60–63.